(12) United States Patent
Chauvet et al.

(10) Patent No.: US 10,256,064 B2
(45) Date of Patent: Apr. 9, 2019

(54) EMERGENCY STOP DEVICE

(71) Applicant: Schneider Electric Industries SAS, Rueil Malmaison (FR)

(72) Inventors: Francis Chauvet, Mouthiers (FR); Tewfik Meftah, Grenoble (FR); Dominique Benni, Mornac (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 707 days.

(21) Appl. No.: 14/745,857

(22) Filed: Jun. 22, 2015

(65) Prior Publication Data
US 2016/0012992 A1 Jan. 14, 2016

(30) Foreign Application Priority Data
Jul. 9, 2014 (FR) ...................................... 14 56619

(51) Int. Cl.
*H01H 50/08* (2006.01)
*H01H 47/22* (2006.01)
(Continued)

(52) U.S. Cl.
CPC ............ *H01H 47/22* (2013.01); *H01H 3/022* (2013.01); *H01H 9/168* (2013.01); *H01H 71/32* (2013.01);
(Continued)

(58) Field of Classification Search
CPC ........ H01H 47/22; H01H 3/022; H01H 9/168; H01H 71/32; H01H 3/04; H01H 2221/022; H02H 3/04
See application file for complete search history.

(56) References Cited

U.S. PATENT DOCUMENTS 2,849,571 A * 8/1958 Duffing .................... A62C 4/02
                                              335/167
5,493,882 A * 2/1996 Jasper ................ G07C 9/00912
                                              70/278.4
(Continued)

FOREIGN PATENT DOCUMENTS

CN        101657872 A     2/2010
CN        102414766 A     4/2012
(Continued)

OTHER PUBLICATIONS

French Preliminary Search Report dated Mar. 13, 2015 in French Application 14 56619, filed on Jul. 9, 2014 (with English Translation of Categories of Cited Documents and Written Opinion).
(Continued)

*Primary Examiner* — Zeev V Kitov
(74) *Attorney, Agent, or Firm* — Oblon, McClelland, Maier & Neustadt, L.L.P.

(57) ABSTRACT

An emergency stop device including a control assembly which can be actuated in translation along a control axis between a released position and an actuated position, a locking element cooperating with the control assembly and able to assume a locking position to hold the control assembly in its actuated position, a read device configured to generate a command for authorising unlocking of the control assembly, an unlocking actuator configured to act on the locking device to release the control assembly from its actuated position, an actuating element which can be actuated in movement to generate a mechanical energy, and an energy generator configured to convert the mechanical energy supplied by a movement of the actuating element into an electrical energy intended to power the read device.

11 Claims, 12 Drawing Sheets

(51) Int. Cl.
*H01H 71/32* (2006.01)
*H02H 3/04* (2006.01)
*H01H 3/02* (2006.01)
*H01H 9/16* (2006.01)

(52) U.S. Cl.
CPC ......... *H02H 3/04* (2013.01); *H01H 2221/022* (2013.01)

(56) References Cited

U.S. PATENT DOCUMENTS

| | | | |
|---|---|---|---|
| 9,849,032 B2* | 12/2017 | Schuele | A61F 9/00804 |
| 2011/0315663 A1* | 12/2011 | Bonjean | H01H 9/548 |
| | | | 218/140 |
| 2013/0134798 A1* | 5/2013 | Meftah | H01H 3/022 |
| | | | 307/104 |

FOREIGN PATENT DOCUMENTS

| | | |
|---|---|---|
| CN | 102906846 A | 1/2013 |
| CN | 103380555 A | 10/2013 |
| DE | 10 2011 109 381 A1 | 2/2013 |
| FR | 3 000 286 A1 | 6/2014 |
| WO | WO 2012/025335 A1 | 3/2012 |

OTHER PUBLICATIONS

Search Report dated Nov. 13, 2018 in Chinese Office Action 201510589194.8.

\* cited by examiner

A-A

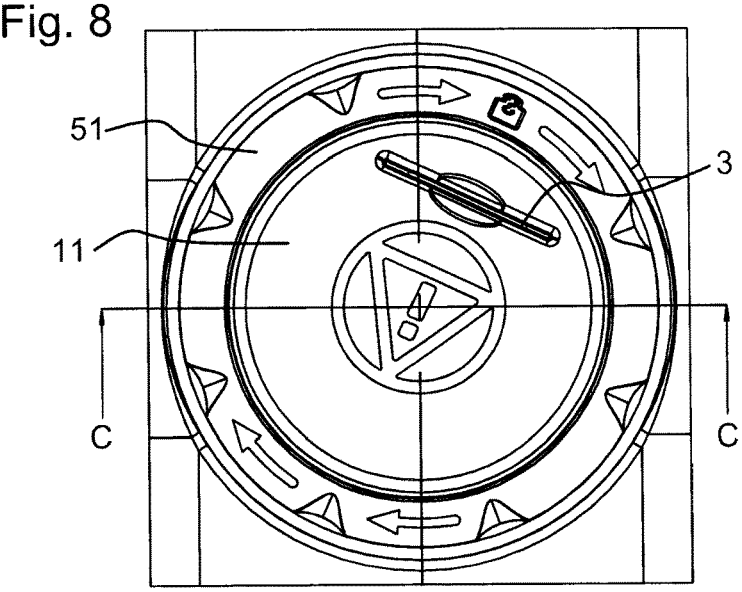
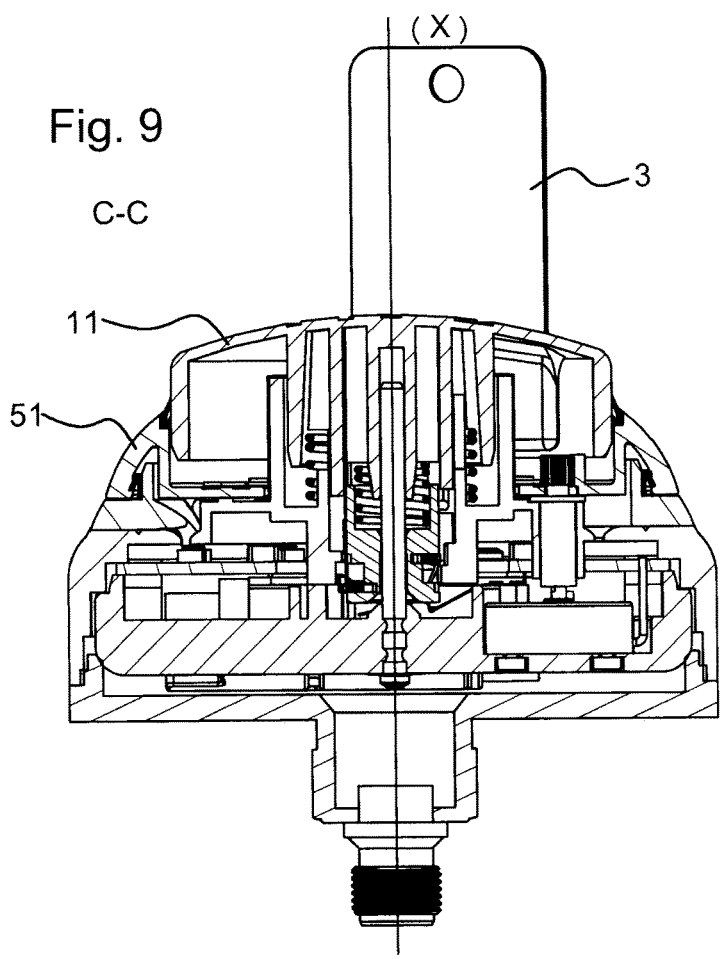

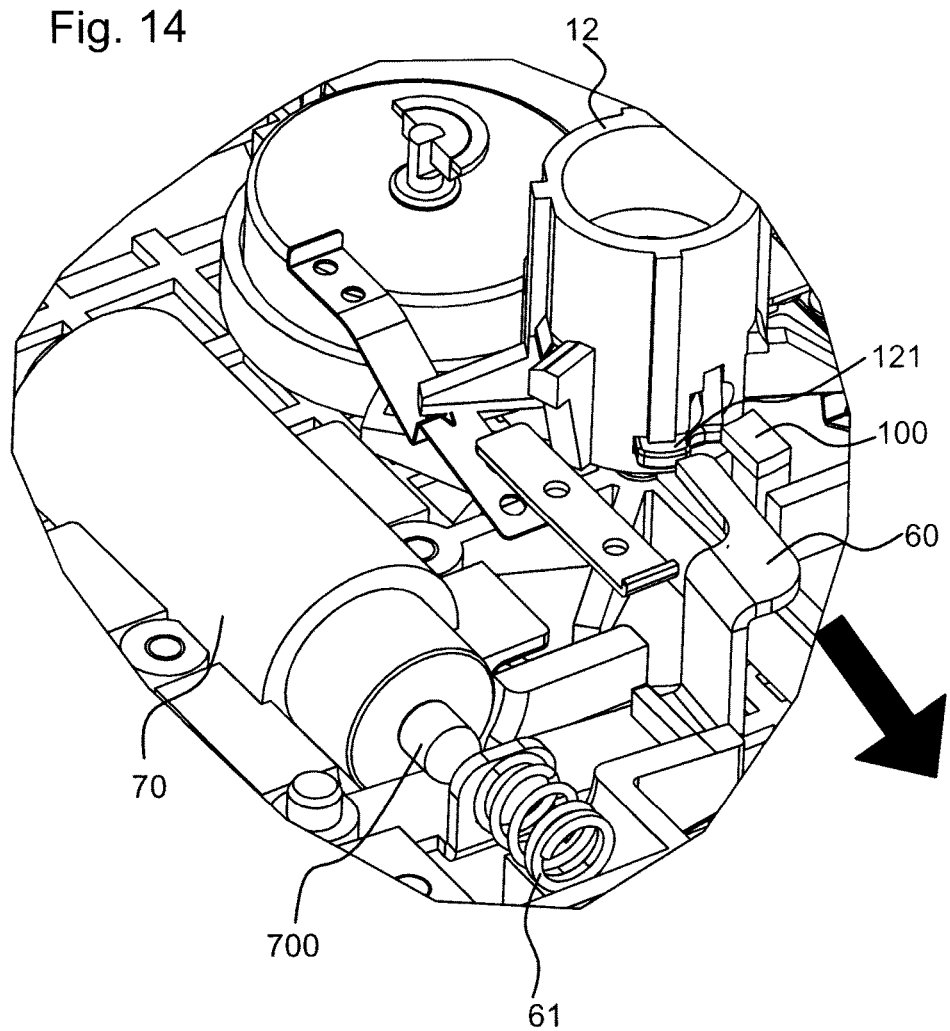

EMERGENCY STOP DEVICE

TECHNICAL FIELD OF THE INVENTION

The present invention relates to an emergency stop device. The invention concerns more precisely the unlocking of the emergency stop device after actuation.

STATE OF THE ART

An emergency stop device is intended to open an electrical circuit in an emergency, for example on malfunction or imminent danger. For this, it comprises a control button on which an operator acts. Pressing this control button causes opening of an electrical control circuit. In such a device, once the control button has been depressed it remains in this position, such that the electrical circuit remains open until the danger has been eliminated. To reset the system, the emergency stop device must first be unlocked. Often the unlocking of an emergency stop device is secured. Various solutions have already been implemented here for unlocking an emergency stop device. The most common uses a key, such as for example described in patent EP1261978B1. However management of the key is often impractical. Another solution is described in patent application DE102011109381A1. This uses a biometric reader so that unlocking can only be authorised after authentication of the operator. The latter solution has the advantage of eliminating the problem of key management, but requires the presence of an energy source to power the biometric reader.

The object of the invention is to propose an emergency stop device in which unlocking is secured by authentication, and which requires no internal or external electrical energy source.

PRESENTATION OF THE INVENTION

This object is achieved by an emergency stop device comprising:
- at least one electrical contact unit of the normally closed type,
- a control assembly which can be actuated in translation along a control axis between a released position and an actuated position, and cooperates with the contact unit,
- a locking element cooperating with the control assembly and able to assume a locking position to hold the control assembly in its actuated position,
- a read device comprising a microcontroller configured to generate a command for authorising unlocking of the control assembly,
- an unlocking actuator configured to receive the unlocking authorisation command, and to act on the locking device with the aim of releasing the control assembly from its actuated position,
- an actuating element which can be actuated in movement to generate a mechanical energy,
- an energy generator arranged to convert the mechanical energy supplied by a movement of the actuating element into an electrical energy intended to power the read device.

When an emergency stop device is actuated, this interrupts the main electrical power supply, which makes it difficult to provide electrical power to a read device used for unlocking. An internal energy source is then necessary. The solution of the invention allows this internal energy source to be omitted and thus enables the emergency stop device to be unlocked in all situations.

According to a variant embodiment, the read device is of the RFID type and comprises an antenna connected to the microcontroller.

According to another feature, the antenna is arranged coaxially around the control axis.

According to another feature, the device comprises an antenna extension arranged to be in magnetic coupling with said antenna.

According to another variant embodiment, the read device is of the biometric type.

According to another variant embodiment, the read device is of the NFC type.

According to another feature, the control assembly comprises a control button moveable in the axial direction between a released position and a depressed position.

According to another feature, the control button comprises a housing configured to receive a badge.

According to another feature, the unlocking actuator comprises a solenoid provided with a tappet and an electromagnetic coil configured to be powered by the unlocking authorisation signal.

According to another feature, the actuating element is a ring moveable in rotation and arranged coaxially to the control assembly.

According to another feature, the generator is of the electromagnetic type and comprises a moveable element cooperating with the actuating element, at least one permanent magnet and an electromagnetic coil configured to move relative to each other with the aim of creating an induced electrical current in said electromagnetic coil.

BRIEF DESCRIPTION OF THE FIGURES

Further characteristics and advantages will appear from the detailed description below given in relation to the attached drawings in which:

FIG. 8 depicts in top view the emergency stop device according to the invention in the actuated position with the ring turned for generating electrical energy, FIG. 9 depicts the emergency stop device according to the invention along section C-C defined on FIG. 8, FIGS. 11, 12, 13, 14 depict detail Y marked on FIG. 10 in the various operating phases of the device.

DETAILED DESCRIPTION OF AT LEAST ONE EMBODIMENT

The emergency stop device of the invention comprises a housing and a control head arranged on the housing. The housing comprises a board 20 forming a base of the device and a cover 22 on which the control head is mounted. The device also comprises a support 21 situated in the housing and on which a printed circuit board 23 is mounted.

Figure 5:
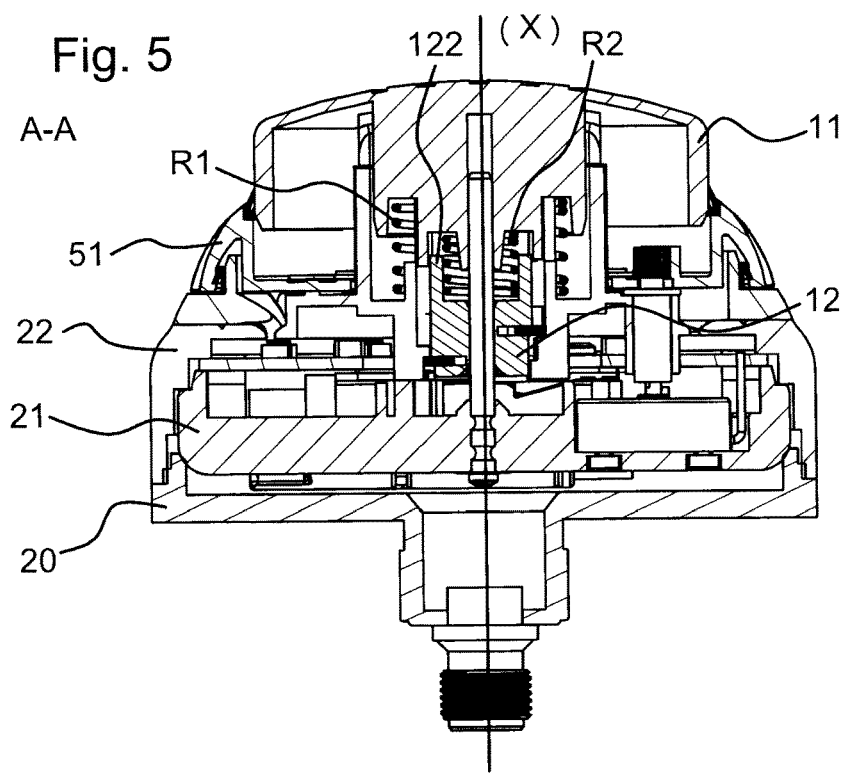
FIG. 5 depicts the emergency stop device according to the invention in the released position, along section A-A defined on FIG. 4.
Figure 6:
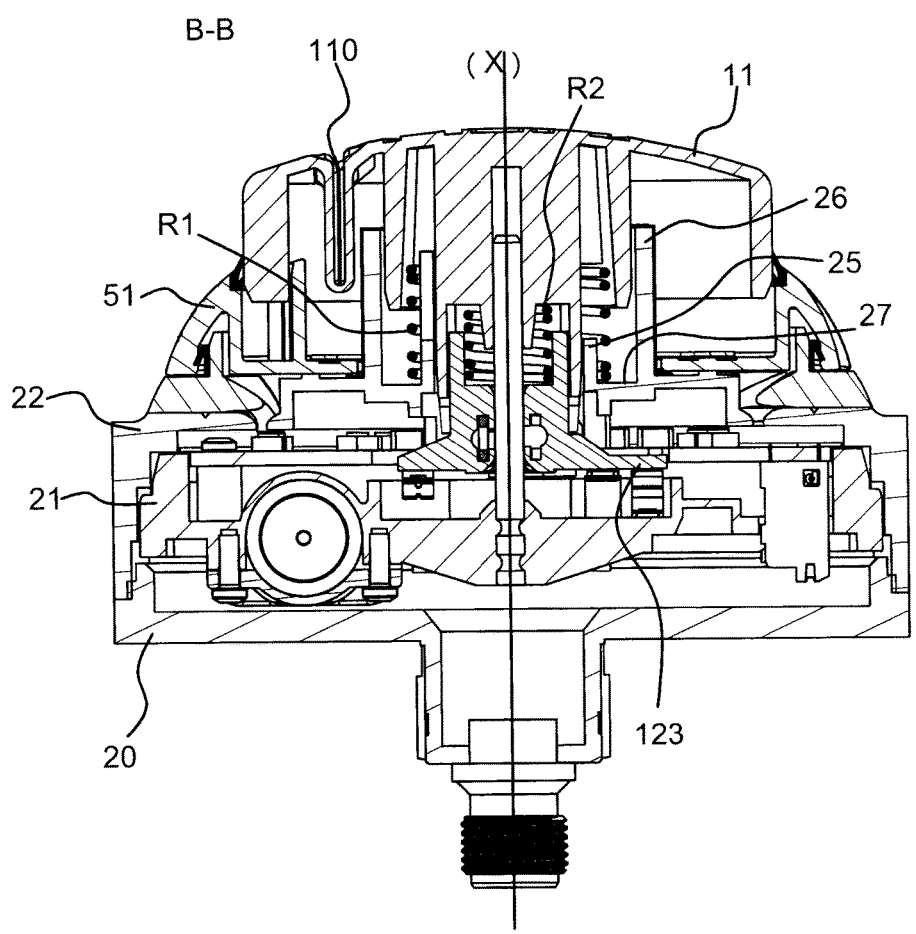
FIG. 6 depicts the emergency stop device according to the invention in the released position, along section B-B defined on 4.

The cover 22 comprises a central orifice 24, a cylindrical collar 25 formed around the periphery of said central orifice, an internal cylindrical sleeve 26 and an annular cup 27 defined between the collar and the sleeve (FIGS. 5 and 6).

The control head comprises a control assembly of the emergency stop device. This control assembly comprises a moveable control button 11 able to move in a control axis (X), and a return spring R1 of the helicoidal type housed in the cup 27 and stressed along the control axis (X) by the control button 11 against the housing. The control button 11 is initially in a released position (FIGS. 5 and 6) in which the controlled electrical circuit is closed. By pressing towards the interior of the device, the control button 11 may be brought into an actuated position (FIG. 7) in which it comes to rest against the housing, thus allowing the electrical circuit to be opened positively. After actuation, the control button 11 is released but remains engaged in its actuated position (FIG. 7) in which the electrical circuit remains open. The electrical circuit remains open until the device is unlocked.

Figure 7:
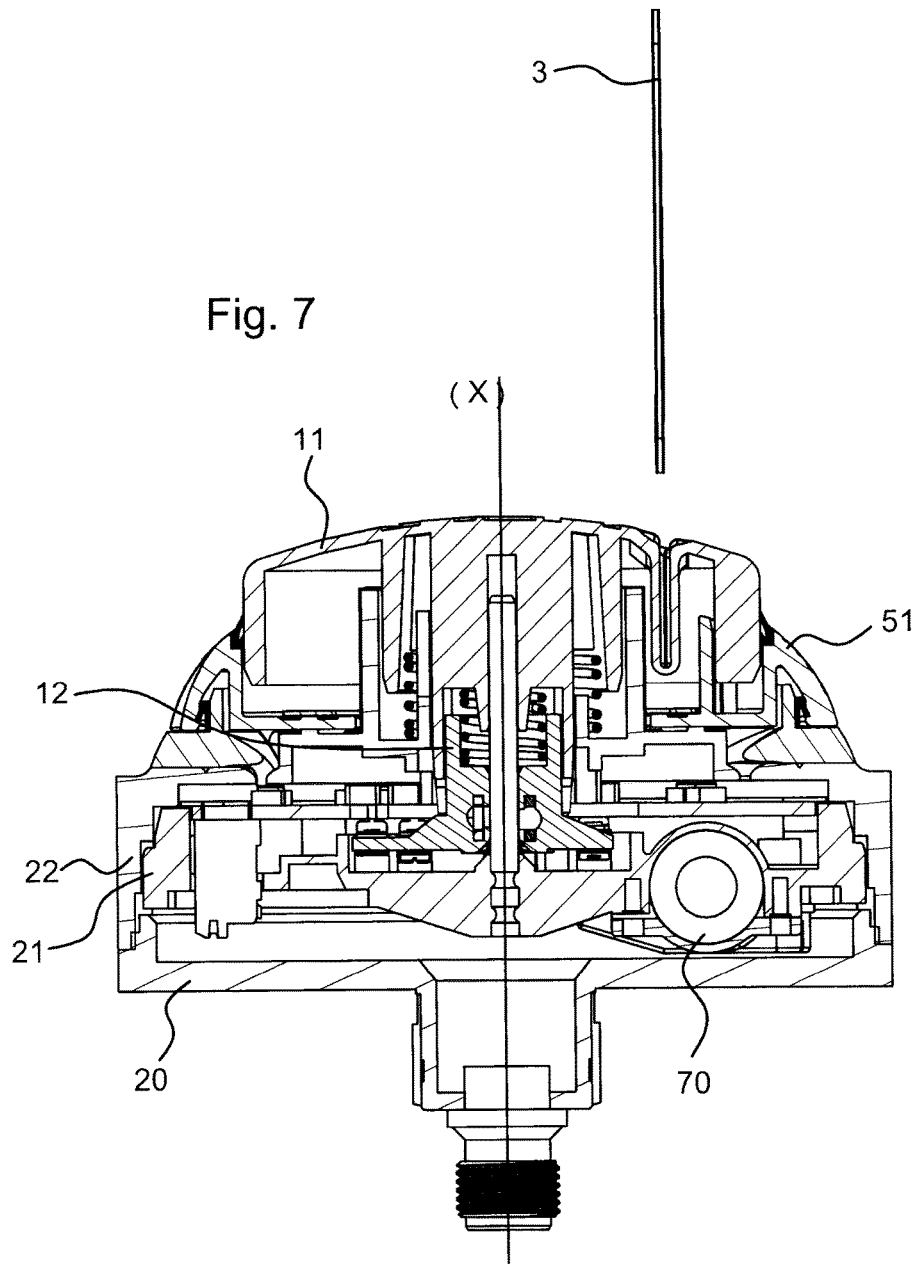
FIG. 7 depicts the emergency stop device according to the invention in the actuated and locked position, along the same section A-A defined on FIG. 4, and ready to receive an unlocking badge.
Figure 10:
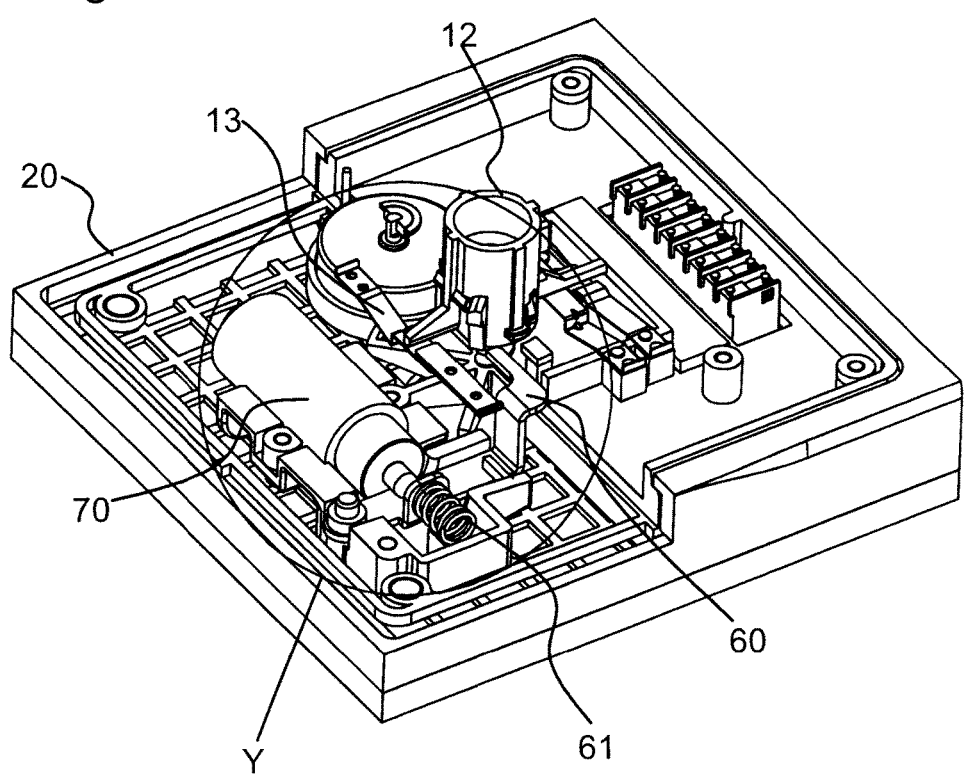
FIG. 10 depicts the board as shown on FIG. 1 on which the support is assembled, bearing in particular the control element, the energy generator, the unlocking actuator.

The control assembly of the emergency stop device also comprises a control element 12 engaged on the control button 11 via fixing elements produced on the control button 11. The control element 12 comprises an axial central drilling and a collar 122 situated on the periphery of said drilling and defining a seat intended to receive an opening spring R2, which rests firstly against the control element 12 and secondly against the control button 11. The control element 12 is stressed in translation along the control axis (X) by the opening spring R2 against the fixing elements of the control button 11. The control button 11 and the control element 12 are free in translation towards each other by compression of the opening spring R2. When the control button 11 is in the released position, the control element 12 is in a released position (FIGS. 5 and 6). When pressure is exerted on the control button 11 towards its actuated position, the control element 12 initially remains in the released position, which causes compression of the opening spring R2 in order to store the energy. When the opening spring R2 is sufficiently compressed, the control element 12 is suddenly released, driven by the energy stored by the opening spring R2. The control element 12 is then in the actuated position (FIG. 7). After actuation, the control element 12 remains engaged in the actuated position and, via the fixing elements, holds the control button 11 in the actuated position towards the interior of the housing 10. If the control button is released, it remains in the actuated position. Unlocking is then necessary to return the control button and the control element to their released position.

The control assembly of the emergency stop device thus comprises an engagement element 121 (FIG. 11), for example consisting of a finger which comes to rest in a radial housing produced on the control element 12, allowing the control assembly to be held in the actuated position. This engagement element 121 is mounted on a helicoidal spring so as to be able to move radially relative to the control axis (X). The engagement element 121 is positioned so as to cooperate with the housing according to the position of the control button 11. The engagement element 121 is able to move in a plane perpendicular to the control axis (X). The engagement element 121 cooperates with stop 100 produced on the housing to allow the control element 12 to engage on the housing when the control button 11 is depressed in its actuated position, and thus to hold the control element 12 and the control button 11 in their actuated position.

The emergency stop device comprises at least one electrical contact unit, generally at least two electrical contact units to ensure redundancy on actuation of the device. Each electrical contact unit comprises a set of normally closed (NC) electrical contacts. Each contact unit is for example composed of one or more positively opening, flexible blade contacts 13 situated in the housing and fixed to the support 21 situated in the housing of the device below the printed circuit board 23. The control unit 12 is provided with two fingers 123 extending outward in opposing radial directions. Each finger 123 is arranged so that it can rest on a flexible blade contact 13 of a separate contact unit when the actuating element 12 is driven by the opening spring R2 towards its actuated position. The printed circuit board 23 is provided with an opening 230 (FIGS. 2 and 3), allowing the control unit 12 to pass through and act on the contact units fixed to the support 21.

According to the invention, the emergency stop device also comprises a read device arranged to authorise or not the unlocking of the emergency stop device after having performed an identification process. The read device may take the form of a badge reader, for example of the RFID type, a biometric reader or any other solution allowing identification of an authorised person. The read device thus comprises a microcontroller, for example soldered to the printed circuit board 23, configured to generate an unlocking authorisation signal in the case of a positive identification.

In the description which follows, we take the example of a badge reader device of the RFID type. In this solution, the control button 11 comprises a housing 110 in the form of a slot, in which the badge 3 to be read by the device is inserted. To read the badge 3, the read device comprises an antenna 40 connected to the microcontroller. This antenna 40 is for example produced by screen-printing on the printed circuit board 23. The screen-printing is applied for example to the periphery of the orifice 230 produced in the printed circuit board 23. Also, the read device may comprise an antenna extension 41 arranged in the control head and positioned in mechanical coupling with the antenna 40 produced by screen-printing. This antenna extension 41 for example takes the form of a cylindrical sleeve comprising a part of plastic material covered by a metallic coating. The antenna extension 41 could also take the form of an electronic label of the RFID type, comprising an antenna used to extend the signal and a microcontroller able to store the data. This label could be read externally via a read station, allowing easy recovery of the data stored in the label.

The emergency stop device according to the invention has the feature of not having any internal or external energy source to power the read device. The read device is in fact powered using an electromagnetic energy generator configured to convert a mechanical energy into an electrical energy.

The control head then comprises an actuating element mechanically coupled to the energy generator 50A, 50B and able to be actuated in movement in order to generate said mechanical energy. Advantageously, this actuating element is composed of a ring 51 separate from the control assembly and moveable in rotation around the control axis (X). This ring 51 is for example arranged around the control button 11 and configured to drive the control assembly in rotation when actuated. Means for rotational guidance are for example provided on the ring 51 while studs 28 (FIG. 1) configured to cooperate with these guide means are provided on the cover 22 of the housing. The ring 51 is configured to perform a rotation through a specific angle defined by the position of the studs 28. This angle is for example around 25° (FIG. 8). At least part or all of the rotational travel of the ring is used to generate electrical energy.

The energy generator 50A, 50B is configured to supply electrical energy to the microcontroller during a badge identification process, and to the unlocking actuator.

Figure 2:
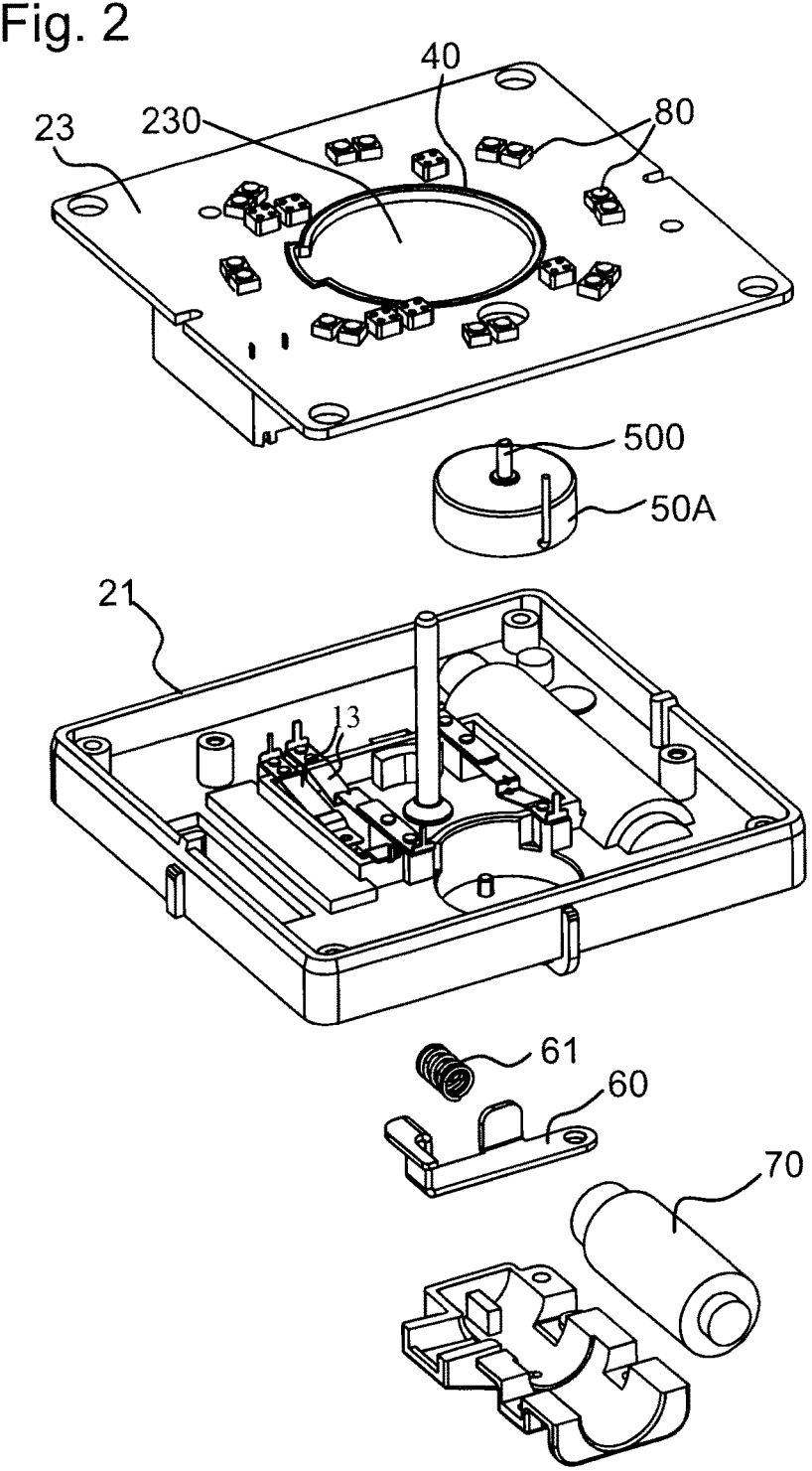
FIG. 2 depicts in exploded view the support of the emergency stop device, intended to receive in particular a rotary electromagnetic energy generator, the printed circuit board and the unlocking actuator.
Figure 3:
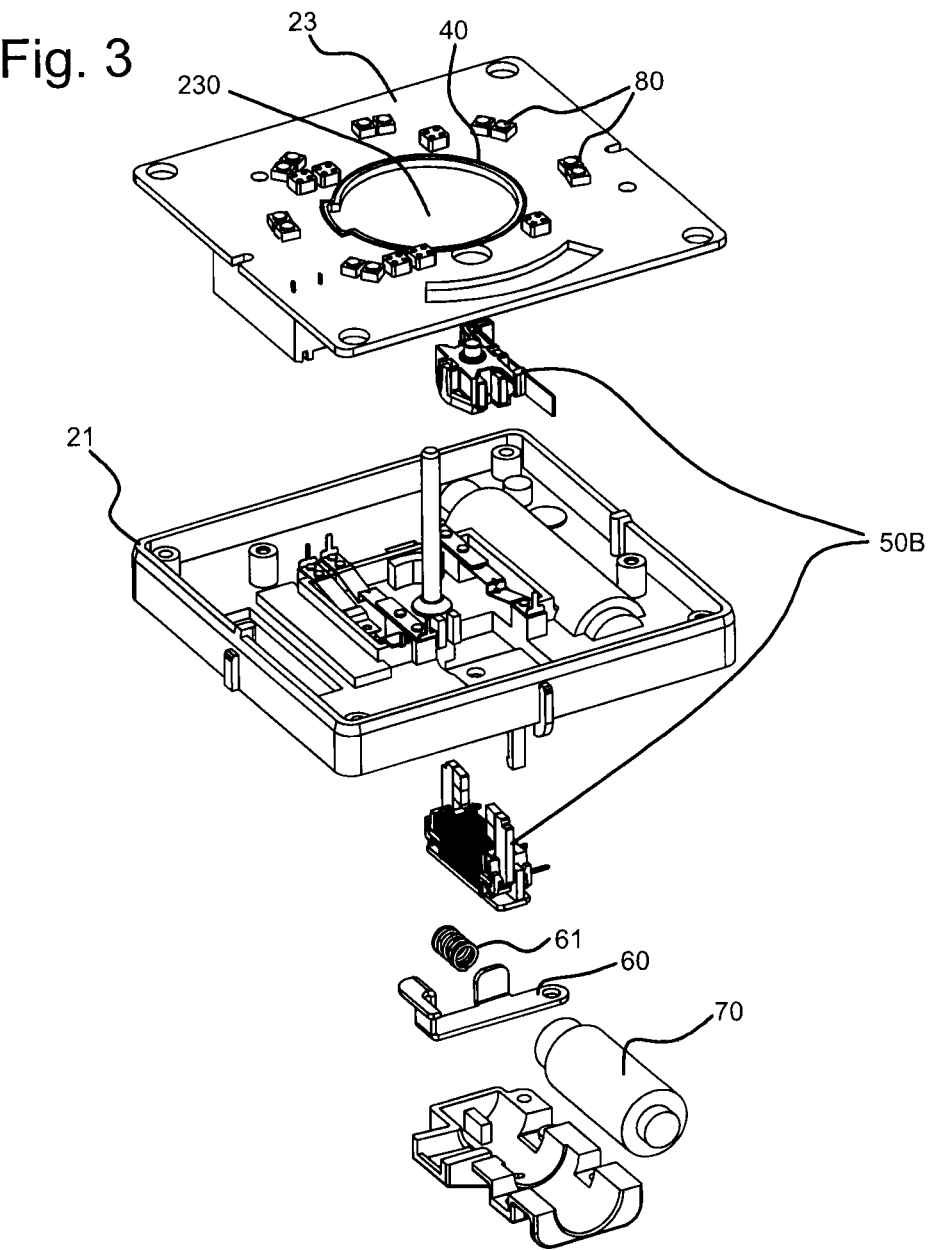
FIG. 3 depicts in exploded view the support of the emergency stop device, intended to receive in particular an electromagnetic energy generator with rocker bridge, the printed circuit board and the unlocking actuator.
Figure 4:
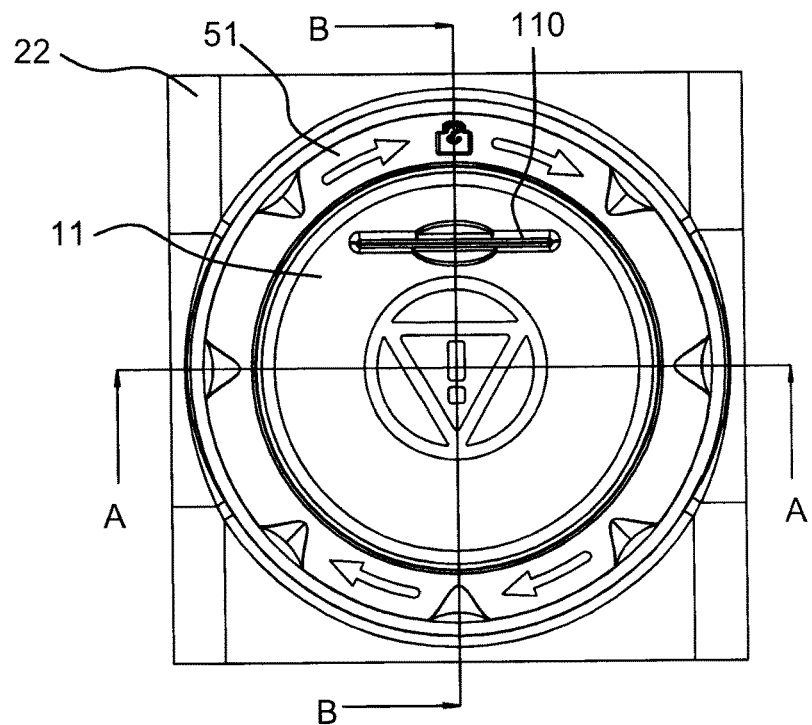
FIG. 4 depicts in a top view the emergency stop device according to the invention.

The energy generator 50A, 50B may assume different configurations. On the attached drawings, two separate configurations are shown (FIGS. 2 and 3). In a first configuration shown on FIG. 2, the energy generator 50A is of the rotary type. It then comprises a moveable rotary element 500 mechanically coupled to the ring 51 and configured to be driven in rotation by the ring on its rotation. This type of generator is well known and is not described in detail in the present description. In a second configuration shown on FIG. 3, the energy generator 50B is of the type described in U.S. Pat. No. 8,148,856B2. It comprises a magnetic circuit provided with a fixed part 501 passing through an electromagnetic coil 503, and a moveable part 502 comprising a permanent magnet. The moveable part 502 pivots between two extreme positions in order to create a flux variation through the coil 503, which generates an electrical current in the coil winding. In order to generate the maximum possible electrical energy, this energy generator 50B may be brought to perform several rocking movements between its two extreme positions.

The emergency stop device also comprises a locking element configured to cooperate with the control element 12 in order to lock the return of the control assembly to the released position until a badge has been authenticated by the read device. On the attached figures, this locking element takes the form of a lever 60 on which the unlocking actuator 70 may act. Naturally it is understood that the locking element may indeed assume other forms while fulfilling its function of locking the control assembly in the actuated position. The lever 60 used has a free end configured to cooperate with the engagement element 121 in order to block the movement of the control assembly and prevent its return to the released position until the read device has positively identified a badge. Depending on the configuration, the control element 12 could either be blocked in rotation in the plane perpendicular to the control axis (X) or in translation along the control axis (X). The lever 60 is mounted on a spring 61 which stresses this in a pivoting towards its position of locking the control element 12.

The unlocking actuator 70 is powered via an electrical unlocking authorisation command sent from the read device on a positive identification. For example, it comprises a solenoid and a tappet 700 arranged to cooperate with the lever 60 in order to unlock the control assembly.

Figure 11:
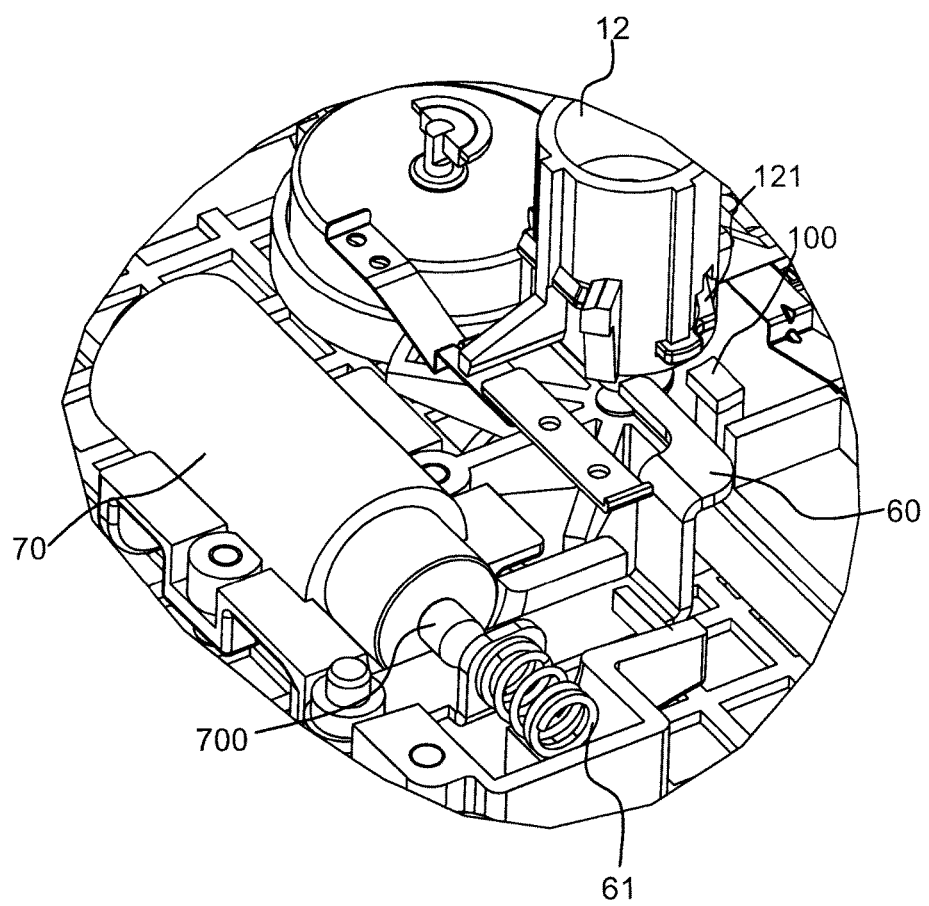
Figure 12:
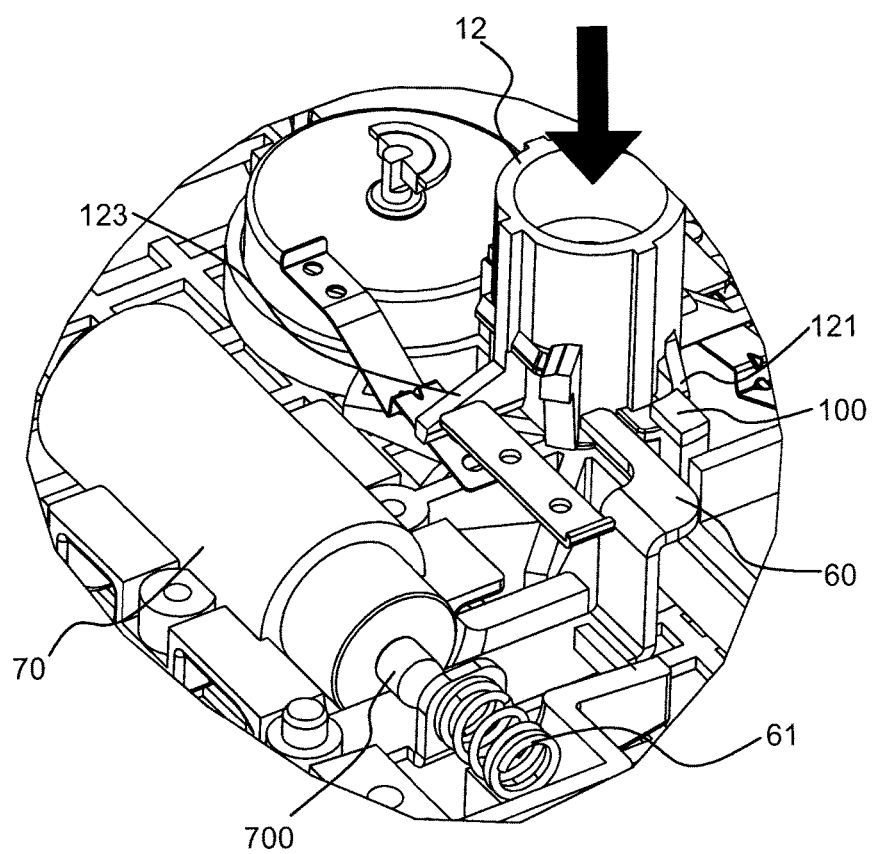
Figure 13:
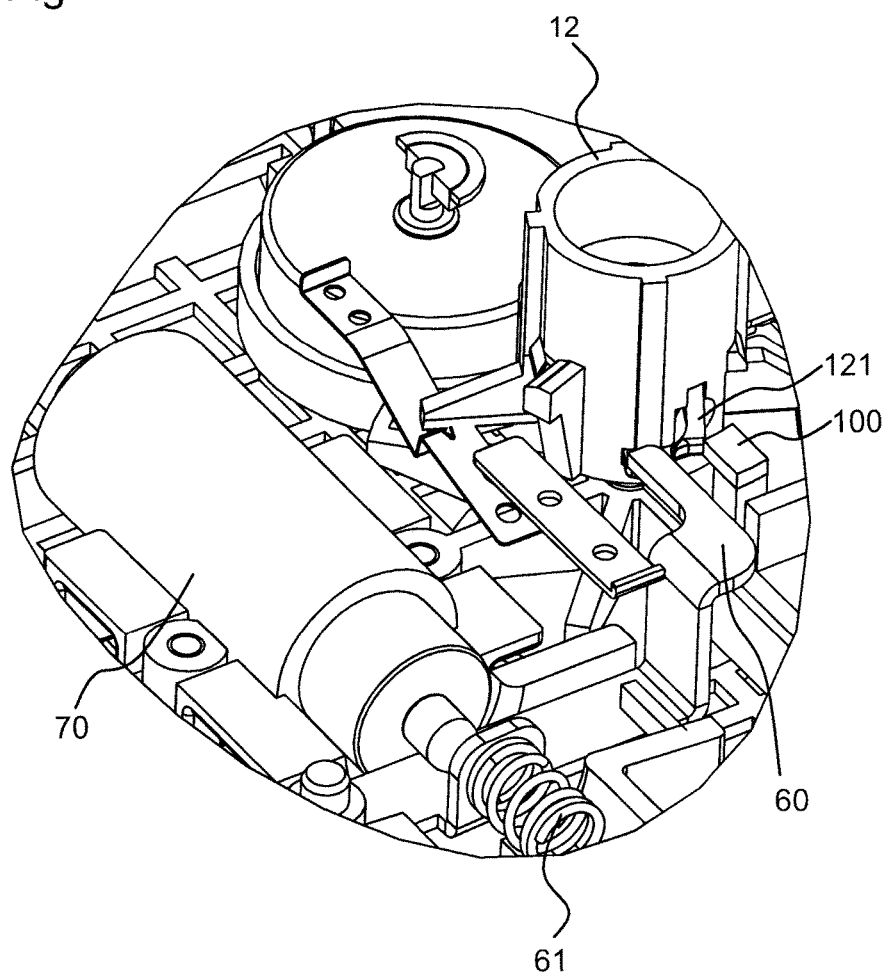

In connection with the attached drawings, the function of an emergency stop device according to the invention connected to an electrical circuit is as follows:
The control assembly is initially in the released position and is unlocked (FIGS. 5, 6 and 11). The contacts 13 of the device are initially in the closed state.
An operator presses the control button 11. The control assembly is driven in rotation as far as its actuated position. The contacts 13 are forced into the open state by the fingers 123 of the control element 12. The engagement element 121 is released from its housing and cooperates with the stop 100 formed on the housing, in order to engage the control element 12 and thus prevent the control assembly from rising to its released position, thus holding the contacts in the open state (FIG. 12). The emergency stop device is now locked and an unlocking operation is required to return it to its initial state.
To unlock the device, an operator introduces an unlocking badge 3 in the slot 110 provided on the control button 11.
The operator then performs a rotation of the ring 51 with the aim of generating an electrical energy. Rotation of the ring 51 drives the control assembly in rotation, releasing the engagement element 121 from the stop 100. Rotation of the ring 51 also causes the actuation of the energy generator 50A, 50B.
The electrical energy generated thanks to the mechanical energy from rotation of the ring 51 powers the read device for identification of the badge 3.
Using the electrical energy received, the read device reads the badge 3 introduced and verifies its identity.
If the badge identification is positive, the read device generates an electrical unlocking authorisation command intended for the unlocking actuator 70.
The unlocking actuator 70 actuates its tappet 700 which pushes the lever 60 (FIG. 14).
The lever 60 pivots around its axis and is freed from the engagement element 121.
The control assembly is released and returns to its released position under the action of the return spring R1 and the opening spring R2.
The control assembly is in the released and unlocked position. The device is operational once more.
If the identification of the badge 3 by the read device is negative, the unlocking actuator 70 is not activated by the read device.
The unlocking lever 60 blocks the movement of the actuating element 12 and hence of the control assembly which cannot continue its travel towards its released position. The ring 51 is returned to its initial position. A new rotation of the ring 51 will then be necessary to command a new identification.

Figure 1:
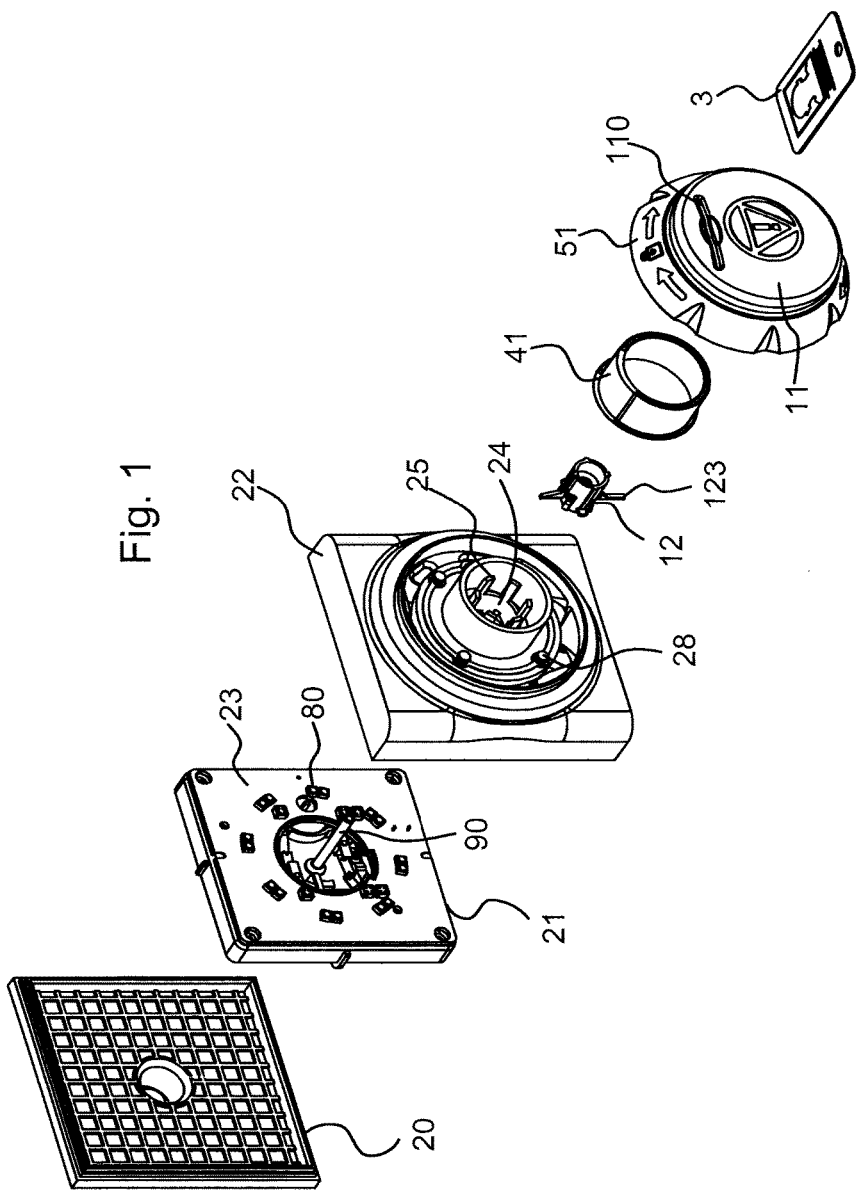
FIG. 1 depicts in exploded view the emergency stop device according to the invention.

As shown on FIGS. 1 and 2, the device advantageously comprises signalling diodes 80 (FIGS. 1 to 3) soldered onto the printed circuit board 23 and intended to signal the state of the device. Preferably, the cover 22 of the housing comprises a transparent portion allowing diffusion of the light emitted by the diodes.

The device also comprises a guide rod 90 for the control assembly. This rod is fixed to the support 21 and passes through the central orifice 24 of the cover. The control element 12 is threaded onto the rod 90 and can slide along this in connection with the control button 11.

According to the invention, when the device is actuated and locked, simple rotation of the ring does not modify the state of the contacts which remain in the open state. The rotation of the ring must be accompanied by a positive identification of a badge in order to cause the control assembly to rise and return the contacts to the closed state.

The invention claimed is:
1. An emergency stop device comprising:
at least one normally closed electrical contact unit, a control assembly configured to be actuated in translation along a control axis between a released position and an actuated position, and to cooperate with the electrical contact unit, a lock cooperating with the control assembly and configured to assume a locking position to hold the control assembly in an actuated position, a read device comprising a microcontroller configured to generate a command for authorizing unlocking of the control assembly, an unlocking actuator configured to receive the unlocking authorization command, and to act on the lock to release the control assembly from the actuated position, an actuating element configured to be actuated independently of the actuation of the control assembly, and to be actuated in movement to generate mechanical energy, when the control assembly is locked in the actuated position, and an energy generator configured to convert the mechanical energy supplied by a movement of the actuating element into an electrical energy to power the read device when the control assembly is locked in the actuated position.

2. The device according to claim 1,
wherein the read device is an RFID read device, and
wherein an antenna is connected to the microcontroller.

3. The device according to claim 2, wherein the antenna is arranged coaxially around the control axis.

4. The device according to claim 2, further comprising an antenna extension arranged to be in magnetic coupling with said antenna.

5. The device according to claim 1, wherein the read device is a biometric read device.

6. The device according to claim 1, wherein the read device is an NFC read device.

7. The device according to claim 1, wherein the control assembly comprises a control button moveable in the axial direction between a released position and a depressed position.

8. The device according to claim 7, wherein the control button comprises a housing configured to receive a badge.

9. The device according to claim 1, wherein the unlocking actuator comprises a solenoid provided with a tappet and an electromagnetic coil configured to be powered by the unlocking authorization signal.

10. The device according to claim 1, wherein the actuating element is a ring moveable in rotation and arranged coaxially to the control assembly.

11. The device according to claim 1, wherein the energy generator is an electromagnetic energy generator and comprises:

a moveable element cooperating with the actuating element, at least one permanent magnet, and an electromagnetic coil configured to move relative to each other in order to create an induced electrical current in said electromagnetic coil.

* * * * *